April 17, 1962  P. R. SCHAEFER ET AL  3,030,489
GAS SHIELDED ARC TORCH
Filed Dec. 7, 1959
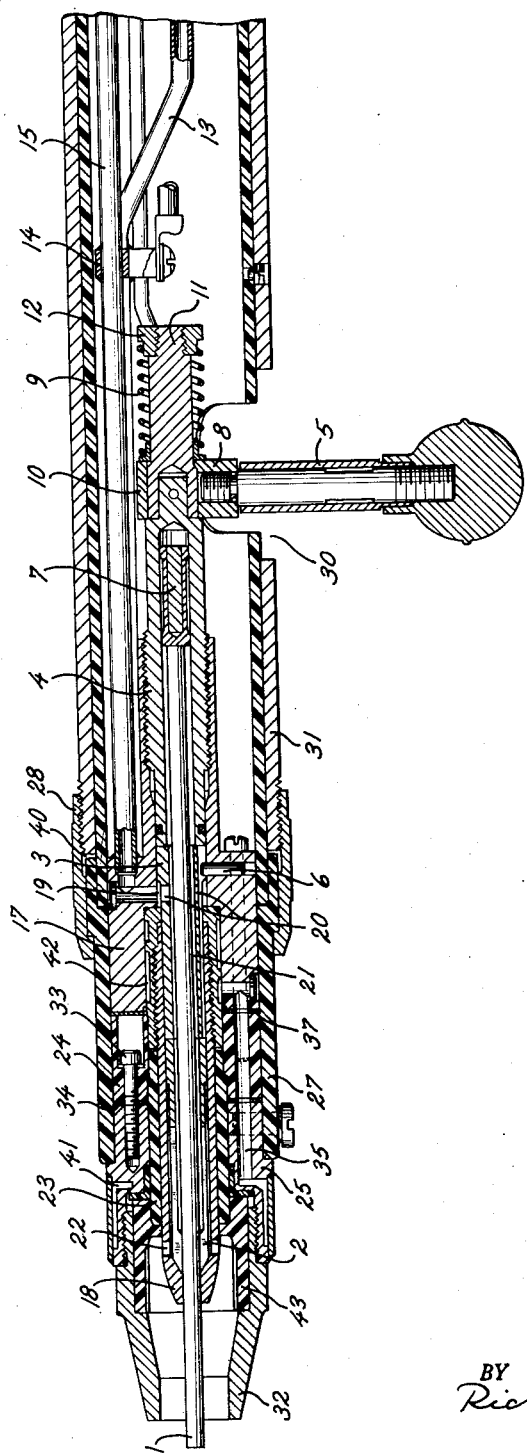
INVENTORS
PETER R. SCHAEFER
JOHN S. KANE
BY
Richard S. Shreve, Jr.
ATTORNEY

3,030,489
GAS SHIELDED ARC TORCH
Peter R. Schaefer, Newark, and John S. Kane, Watchung, N.J., assignors to Union Carbide Corporation, a corporation of New York
Filed Dec. 7, 1959, Ser. No. 857,877
5 Claims. (Cl. 219—75)

One of the problems confronting the users of conventional mechanized non-consumable electrode torches is the difficulty and delay caused by the need to periodically adjust the longitudinal position of the electrode to maintain a constant electrode-to-work distance. In order to obtain quality welds repeatedly in production work with welds having closely controlled bead contour and depth of penetration, it is essential that a constant electrode-to-work distance be maintained. Even when using a non-consumable electrode over a period of use, there is a decrease in the length of the electrode due to electrode erosion. When this occurs it becomes necessary to release the electrode gripping means in the torch in order to permit readjustment of the electrode extension so as to maintain the constant electrode-to-work distance.

In conventional non-consumable electrode welding torches, particularly those of the in-line type preferred for machine installations, design of the torch is such that the electrode gripping means must be released either through the front end of the torch or from the back end of the torch. However, in many mechanized installations the mounting of the torch and the fixturing supporting the weldment are such as to preclude ready accessibility to either the front end or the back end of the torch. In the one case the front end of the torch is often positioned down inside the welding fixture such that it cannot be made accessible without moving the torch out of position to an extent that interference occurs with the fixture. Similarly the back end of the torch is usually encased in a torch supporting means on the machine carriage which entails considerable effort on the part of the operator to gain access to the back end due to the complexity of the fixturing.

Thus it may be seen that readjusting the electrode extension to maintain a constant electrode-to-work distance or constant arc length with conventional mechanized torch designs is a troublesome and time-consuming operation highly undesirable in production applications where downtime results in decreased production rates. In addition even after the front end or back end depending upon the particular torch design have been made accessible, special tools or expensive link mechanisms may be required to release the electrode for readjustment.

An allied problem which also exists in conjunction with many of the currently available non-consumable electrode welding torches results from a torque or twisting effect being applied to the electrode gripping collet in addition to the axial force when it is loaded to grip the electrode by means of a screw type rotatable locking means. This is due to the fact that the colleting fingers of the collet tend to hold firm when gripping the electrode while the opposite end of the collet which contacts the locking means tends to rotate as the locking means is rotated due to the inherent friction between the two parts.

This twisting of the fingers or slotted collet end may result in a loss of clamping or gripping power on the part of the collet due to a reduction in the length of the collet and/or distortion of the cone-shaped seat on the colleting end. This loss may be sufficient to cause improper colleting action or proper electrical contact and insufficient gripping of the electrode. In addition any rotation of the colleting end of the collet due to the friction between the collet and the locking means may well result in scoring of the mating conical seat of the collet body or holder. Thus on reassembly of the electrode gripping torch members, the scoring of the collet body seat causes improper seating of the mating conical seats and therefore poor metal to metal contact between the two parts. The result is a reduction in heat transfer from the hot end of the collet back through the collet body to the torch water cooling passages. Overheating of the colleting end of the collet may cause sticking of the electrode, making it difficult to remove and adjust.

Objects of the present invention are to provide a non-consumable electrode welding torch of the in-line type particularly adapted for machine operation which incorporates an electrode release mechanism which is operable by hand thus requiring no special tools; easily accessible; requires no disassembly of the torch or its support means; and applies only longitudinal or axial force on the collet thus eliminating any tendency to cause twisting of the collet or scoring of the conical seats. An additional object is to provide such a torch that is usable with either pilot arc starting or high frequency starting.

In the drawing, the single FIGURE is a vertical axial section through the preferred embodiment of the torch according to the present invention.

In the torch shown in the drawing, an electrode 1 is gripped by a collet 2. Collet 2 is loaded into the bore of a collet body 18 through the collet head or bushing 3 by means of locking stem 4 which screws into rear body 17. Bushing 3 is slidable in collet body 18 in an axial direction only. Rotation of bushing 3 is prevented by means of pin 6 positioned in rear body 17 such that one end extends into a key slot machined into housing 3. Thus no twisting or rotational torque effect is transmitted to the collet 2 when the locking stem 4 is screwed into the rear body 17 to load the collet to grip the electrode.

Locking stem 4 is actuated by means of lever arm 5 which is screwed into a keyed collar 8 slidably assembled to the hex-shaped section 10 of locking stem 4. Keyed collar 8 is held in its slidable assembled position on hex section 10 of locking stem 4 by means of spring 9 located between collar 8 and spring retaining nut 12 screwed into the back end of locking stem 4.

Lever arm 5 extends outwardly from keyed collar 8 through a side opening 30 in the torch holder assembly. Thus, the lever arm 5 is readily accessible for releasing and gripping the electrode. Movement of lever arm 5 clockwise relative to the longitudinal axis of the torch loads the collet 2 in collet body 18 so as to grip the electrode 1 and establish electrical contact between the collet 2 and electrode 1. Movement in the opposite direction releases the electrode 1. The extent of the opening 30 and the amount of rotation of lever arm 5 is limited to approximately 90°.

Normally, this amount of rotation should provide sufficient forward movement or loading of the collet 2 to properly grip the electrode. However, due to such conditions as wear on the torch colleting parts, a greater degree of forward movement of collet 2 may be required than can be achieved with 90° rotation of lever arm 5. This is provided for in the form shown by the combined use of keyed collar 8 and the spring loaded positioning of the collar 8 on hex-section 10 of locking stem 4.

After the lever arm 5 and collar 8 have been manually rotated clockwise the 90° available in their assembled position, the collar 8 my be lifted from its assembled position on hex-section 10, compressing spring 9, and rotated counterclockwise on the cylindrical section of locking stem 4 such that, when reassembled in its new position on hex-section 10, an additional 90° of rotation is available. This may be repeated if necessary until sufficient forward movement or loading of collet 2 is achieved to properly grip the electrode 1. Thus by having the collar 8 spring loaded in position, the collar 8 will normally be maintained in its assembled position on hex-section 10, yet may be readily repositioned on hex-section 10 to achieve greater or lesser forward movement or loading of collet 2.

A weight 7 slidable within the cylindrical bore of locking stem 4 is included in the torch assembly to serve as a hammer to ensure dropping out of a long electrode when the collet gripping has been released, in spite of any cocking of a long electrode which may occur resulting in a tendency for the electrode to hang-up inside the torch.

The electrical current enters the torch from the power cable attached to the water out tube 13 from which the current passes to the junction block 14 and thence is distributed to the extensions of the three tubes 13, 15 and 16, the water out, shielding gas, and water in tubes, respectively, on the downstream side of junction block 14. By so distributing the current in its path to the electrode through the three tubes rather than one as is conventionally done, the resistance heating effect on any one tube is reduced by two-thirds. From tubes 13, 15 and 16 the current passes through rear body 17 to collet body 18, to collet 2 and thence to electrode 1.

At the front end of the torch, insulation sleeve 23 and insulator body 24 serve to separate the current carrying torch members from the torch front body 25 and nozzle 32. Front body 25 is assembled to insulator sleeve 23 and insulator body 24 by means of three evenly spaced screws 33, with gasket 34 providing a seal for water out passage 35 and water in passage 38. Similarly, insulator body 24 is assembled to the rear body assembly 17 by means of three evenly spaced screws 36 with gasket 37 providing a seal for water passages 35 and 38. The above four-part assembly is held in torch mounting sleeve 27 by means of three evenly spaced radial screws 39. The torch mounting sleeve 27 and its assembled parts are attached to the torch holder 29 by means of retaining nut 28. Torch mounting sleeve 27 is keyed to torch holder 29 by means of locating grooves 40 so as to properly position the tubes 13, 15 and 16 opposite the opening 30 in the torch holder 29 so these tubes do not interfere with movement of lever arm 5.

The shielding gas from tube 15 enters the annular chamber 19 in rear body 17 and passes through radial holes 20 in bushing 3 to the annulus 21 formed between the electrode and the bushing 3 and collet 2. From the annulus 21, the shielding gas passes through the slots in collet 2 and out radial holes 22 in collet body 18 to the nozzle 32.

Cooling water flows from water in tube 16, through passage 38 to annular cooling chamber 41 in front body 25. On its return passage, the water flows from chamber 41 through passage 35 to channeled annular water chamber 42 in the rear body assembly 17. From chamber 42 the water passes to the water out tube 13. Since collet body 18 screws into the rear body assembly 17 in close proximity to annular water chamber 42, the result is very efficient water cooling of the collet and collet body.

The torch of the invention is adapted for use with both pilot arc and high frequency starting methods. A pilot arc cord connected to front body 25 provides the means for establishing the pilot arc circuit between the electrode 1 and torch nozzle 32.

When using high frequency starting, the pilot arc cord is disconnected. The use of high frequency is made possible by providing the required insulation in the form of insulators and/or air gaps in the torch construction to prevent high frequency discharges from the electrode to metal torch parts not in the welding circuit. Insulator sleeve 23 prevents high frequency arcing between the collet body 18 and torch nozzle 32. Serrations or screw threads 50 on the inner cylindrical surface of insulator sleeve 43 further minimize any tendency for the ionized shielding gas to provide a high frequency path from the collet body 18 to the forward inner surface of the nozzle 32.

What is claimed is:

1. In a gas shielded arc torch comprising a barrel, a collet body secured inside said barrel, a collet slidable inside said body, a screw mounted in said barrel for urging said collet to grip an electrode, a gas directing nozzle surrounding said electrode, a cooling jacket in said barrel, means for supplying electric current through said collet to said electrode, means for supplying gas to said nozzle, means for supplying cooling fluid to said jacket, and cooperating means on said collet and collet body for preventing relative rotation thereof when said collet urging means is operated.

2. In a gas shielded arc torch comprising a barrel, a collet body secured inside said barrel, a collet slidable in said body, a screw mounted in said barrel for urging said collet to grip an electrode, a gas directing nozzle surrounding said electrode, a cooling jacket in said barrel, means for supplying electric current through said collet to said electrode, means for supplying gas to said nozzle, means for supplying cooling fluid to said jacket, said barrel comprising a front body and a rear body aligned therewith but insulated therefrom and having a common bore, said collet body being mounted in said bore in electrical contact with said rear body but insulated from said front body.

3. In a gas shielded arc torch as claimed in claim 2, in which said collet body is screwed into said rear barrel body, and an inner insulator tube is sleeved onto the front end of said collet body inside said front barrel body.

4. In a gas shielded arc torch comprising a barrel, a collet body secured inside said barrel, a collet slidable inside said body, a screw mounted in said body for urging said collet to grip an electrode, a gas directing nozzle surrounding said electrode, a cooling jacket on said barrel, means for supplying welding current through said collet to said electrode, means for supplying gas to said nozzle, means for supplying cooling fluid to said jacket, said barrel comprising a front body and a rear body aligned therewith but insulated therefrom and having a common bore, said collet body being mounted in said bore in electrical contact with said rear body but insulated from said front body, said front body having a socket receiving said nozzle, a nozzle insulator sleeve between said nozzle and said collet body, and an insulator ring having a radial flange between the bottom of said socket and said nozzle insulator sleeve and a circumferential flange between said collet body and said front barrel body.

5. In a gas shielded arc torch as claimed in claim 1, in which said collet urging screw is provided with easily accessible hand operated release mechanism which operates without the need for tools and without disassembly of the torch.

References Cited in the file of this patent

UNITED STATES PATENTS

| | | |
|---|---|---|
| 2,473,258 | Potter | June 14, 1949 |
| 2,765,144 | Layden | Oct. 2, 1956 |
| 2,794,898 | Gibson | June 4, 1957 |